(12) United States Patent
Jadhav et al.

(10) Patent No.: US 12,547,800 B2
(45) Date of Patent: Feb. 10, 2026

(54) SYSTEM AND METHOD FOR IDENTIFICATION AND FORECASTING FOULING OF HEAT EXCHANGERS IN A REFINERY

(71) Applicant: Tata Consultancy Services Limited, Mumbai (IN)

(72) Inventors: Vishal Sudam Jadhav, Pune (IN); Anirudh Deodhar, Pune (IN); Sakhinana Sagar Srinivas, Pune (IN); Venkataramana Runkana, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 1183 days.

(21) Appl. No.: 17/476,746

(22) Filed: Sep. 16, 2021

(65) Prior Publication Data

US 2022/0083716 A1   Mar. 17, 2022

(51) Int. Cl.
*G06F 30/27* (2020.01)
*C10G 75/00* (2006.01)
(Continued)

(52) U.S. Cl.
CPC ............. *G06F 30/27* (2020.01); *C10G 75/00* (2013.01); *F28F 19/00* (2013.01);
(Continued)

(58) Field of Classification Search
CPC ........ G06F 30/27; G06F 30/23; G06F 18/217; G06F 2119/02; G06F 2119/08;
(Continued)

(56) References Cited

U.S. PATENT DOCUMENTS 7,455,099 B2   11/2008   Osborn et al.
10,328,408 B2   6/2019   Victor et al.
(Continued)

FOREIGN PATENT DOCUMENTS

WO   WO 2021/070201 A2   4/2021

OTHER PUBLICATIONS

Vijaysai P et al., "Predictive Performance Assessment of Heat Exchangers for Proactive Remediation," 2006 IEEE International Conference on Industrial Technology, Mumbai, India, 2006, pp. 3055-3060.*

(Continued)

*Primary Examiner* — Manuel L Barbee
(74) *Attorney, Agent, or Firm* — Finnegan, Henderson, Farabow, Garrett & Dunner, LLP

(57) ABSTRACT

Fouling is formation of deposits on the heat exchanger surfaces that adversely affects operation of heat exchanger. Fouling can be approximated through a set of estimated heat exchanger parameters, which may not be accurate, leading to uncertainty in operation/maintenance decisions and hence the losses. A system and a method for identification and forecasting fouling of a plurality of heat exchangers in a refinery has been provided. The system comprises a digital replica of the heat exchanger network. The digital replica is configured to receive real-time sensor data from a plurality of data sources and provides real-time soft sensing of key parameters. The system is also configured to diagnose the reasons behind a specific condition of fouling. Further, an advisory is provided, that alerts and recommends corrective actions. The system provides estimate for the remaining useful life (RUL) of the heat exchangers and suggests the cleaning schedule.

17 Claims, 13 Drawing Sheets

(51) Int. Cl.

| | |
|---|---|
| *F28F 19/00* | (2006.01) |
| *G05B 23/02* | (2006.01) |
| *G06F 18/21* | (2023.01) |
| *G06F 30/23* | (2020.01) |
| *G06F 119/02* | (2020.01) |
| *G06F 119/08* | (2020.01) |
| *G06N 5/022* | (2023.01) |
| *G06N 5/046* | (2023.01) |
| *G06N 20/00* | (2019.01) |

(52) U.S. Cl.
CPC ..... *G05B 23/0221* (2013.01); *G05B 23/0283* (2013.01); *G06F 18/217* (2023.01); *G06F 30/23* (2020.01); *G06N 5/022* (2013.01); *G06N 5/046* (2013.01); *G06N 20/00* (2019.01); *F28F 2200/00* (2013.01); *G06F 2119/02* (2020.01); *G06F 2119/08* (2020.01)

(58) Field of Classification Search
CPC ...... C10G 75/00; F28F 19/00; F28F 2200/00; G05B 23/0221; G05B 23/0283
See application file for complete search history.

(56) References Cited

U.S. PATENT DOCUMENTS

| | | | |
|---|---|---|---|
| 2019/0145722 A1* | 5/2019 | Myers | C02F 1/00 |
| 2019/0331336 A1* | 10/2019 | Qi | F22B 35/18 |
| 2021/0041347 A1* | 2/2021 | Shehri | G06N 20/20 |
| 2021/0180891 A1* | 6/2021 | Rousselet | F28D 5/00 |

OTHER PUBLICATIONS

Tong et al., "Online Ash Fouling Prediction for BoilerSupport Vector Regression," (2019).

* cited by examiner

SYSTEM AND METHOD FOR IDENTIFICATION AND FORECASTING FOULING OF HEAT EXCHANGERS IN A REFINERY

PRIORITY CLAIM

This U.S. patent application claims priority under 35 U.S.C. § 119 to: Indian provisional application No. 202021040367, filed on Sep. 17, 2020. The entire contents of the aforementioned application are incorporated herein by reference.

TECHNICAL FIELD

The disclosure herein generally relates to the field of refinery, and, more particularly, to a method and a system for identification and forecasting fouling of heat exchangers in refinery such as an oil and gas refinery.

BACKGROUND

Fouling is formation of deposits on the heat exchanger surfaces that adversely affects a heat exchange and other functions of the heat exchanger. Crude oil from storage tanks is fed to the heat exchangers of the crude pre-heat train. Fouling occurs due one or more of combinations of various reasons such as sedimentation, crystallization, biological growth, chemical reactions, or corrosion products freezing among others.

Most of the fouling arises from Asphaltene deposition from crude oil onto metal surfaces of the pre-heat train heat exchangers. Fouling in the refinery heat exchangers may also be caused by inorganic compounds, carbon deposition etc. For example, transfer line exchangers undergo fouling due to carbon deposition, pre-heat train heat exchangers undergo fouling due asphaltene deposition. Fouling of heat exchangers in petroleum refining industry leads to several problems such as—operating problems—decline in furnace inlet temperatures, reduced efficiency of heat recovery units, high operating costs—increased fuel consumption, high pumping power, increased carbon footprint, reduced throughput, increased maintenance costs and fouling in upstream heat exchangers.

Fouling cannot be measured directly in real-time. It can at best be approximated through a set of estimated heat exchanger parameters. These estimations may or may not be accurate, leading to uncertainty in operation/maintenance decisions and hence the losses.

SUMMARY

Embodiments of the present disclosure present technological improvements as solutions to one or more of the above-mentioned technical problems recognized by the inventors in conventional systems. For example, in one embodiment, a system for identification and forecasting fouling of a plurality of heat exchangers in a refinery. The system comprises an input/output interface, one or more hardware processors and a memory. The memory is in communication with the one or more hardware processors, wherein the one or more first hardware processors are configured to execute programmed instructions stored in the one or more first memories, to: receive a plurality of data related to a heat exchanger network from a plurality of data sources, wherein the network comprises the plurality of heat exchangers in the refinery; preprocess the received plurality of data using a plurality of pre-built models present in a data transformation unit; soft sense a plurality of operating parameters, a plurality of fouling parameters and a fouling propensity index for each heat exchanger amongst the plurality of heat exchangers using pre-built models present in an observer unit; detect in real-time a root cause of fouling by comparing the soft sensed plurality of operating parameters, the plurality of fouling parameters and the fouling propensity index using a set of predefined rules present in an analyzer unit; forecast the fouling propensity index for a predefined forecast horizon for each heat exchanger amongst the plurality of heat exchangers using a plurality of pre-built forecast models present in a predictor unit; find a remaining useful life (RUL) of each heat exchanger amongst the plurality of heat exchangers using the forecasted fouling propensity index for the predefined forecast horizon; and recommend one or more of activities based on a set of forecasted parameters, operation constraint parameters and the RUL of each of the heat exchangers, wherein the one or more activities comprises: a cleaning and maintenance schedule of one or more of heat exchangers, or a set of operational changes in the one or more heat exchangers to increase the RUL.

In another aspect, a method for identification and forecasting fouling of a plurality of heat exchangers in a refinery is provided. Initially, a plurality of data is received related to a heat exchanger network from a plurality of data sources, wherein the network comprises the plurality of heat exchangers in the refinery. In the next step, the received plurality of data is preprocessed using a plurality of pre-built models present in a data transformation unit. Further, a plurality of operating parameters, a plurality of fouling parameters and a fouling propensity index are soft sensed for each heat exchanger amongst the plurality of heat exchangers using pre-built models present in an observer unit. A root cause of fouling is then detected by comparing the soft sensed plurality of operating parameters, the plurality of fouling parameters and the fouling propensity index using a set of predefined rules present in an analyzer unit. Further, the fouling propensity index is forecasted for a predefined forecast horizon for each heat exchanger amongst the plurality of heat exchangers using a plurality of pre-built forecast models present in a predictor unit. In the next step, a remaining useful life (RUL) is obtained of each heat exchanger amongst the plurality of heat exchangers using the forecasted fouling propensity index for the predefined forecast horizon. And finally, one or more of activities are recommended based on a set of forecasted parameters, operation constraint parameters and the RUL of each of the heat exchangers, wherein the one or more activities comprises: a cleaning and maintenance schedule of one or more of heat exchangers, or a set of operational changes in the one or more heat exchangers to increase the RUL.

In yet another aspect, one or more non-transitory machine-readable information storage mediums comprising one or more instructions which when executed by one or more hardware processors cause identification and forecasting fouling of a plurality of heat exchangers in a refinery is provided. Initially, a plurality of data is received related to a heat exchanger network from a plurality of data sources, wherein the network comprises the plurality of heat exchangers in the refinery. In the next step, the received plurality of data is preprocessed using a plurality of pre-built models present in a data transformation unit. Further, a plurality of operating parameters, a plurality of fouling parameters and a fouling propensity index are soft sensed for each heat exchanger amongst the plurality of heat exchangers using pre-built models present in an observer unit. A root cause of fouling is then detected by comparing the soft sensed plurality of operating, the plurality of fouling parameters and the fouling propensity index using a set of predefined rules present in an analyzer unit. Further, the fouling propensity index is forecasted for a predefined forecast horizon for each heat exchanger amongst the plurality of heat exchangers using a plurality of pre-built forecast models present in a predictor unit. In the next step, a remaining useful life (RUL) is obtained of each heat exchanger amongst the plurality of heat exchangers using the forecasted fouling propensity index for the predefined forecast horizon. And finally, one or more of activities are recommended based on a set of forecasted parameters, operation constraint parameters and the RUL of each of the heat exchangers, wherein the one or more activities comprises: a cleaning and maintenance schedule of one or more of heat exchangers, or a set of operational changes in the one or more heat exchangers to increase the RUL.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
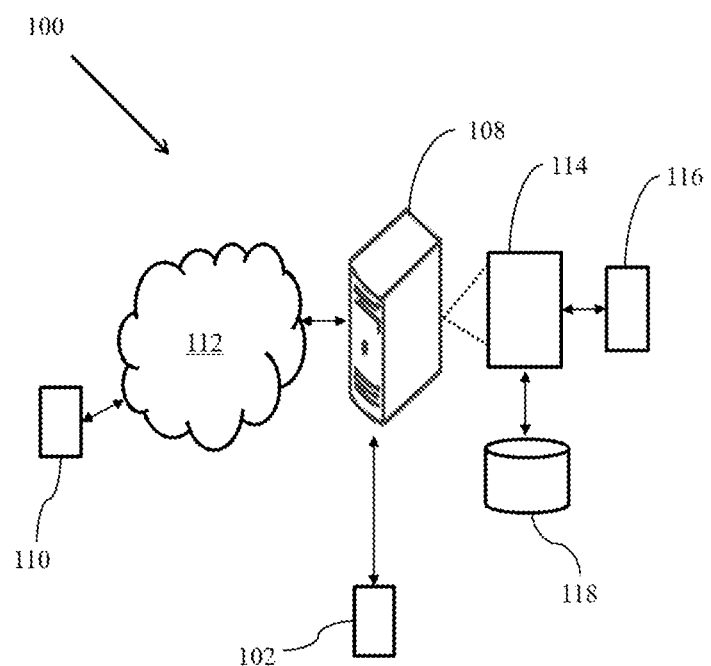
FIG. 1 illustrates a network diagram of a system for identification and forecasting fouling of heat exchangers in oil and gas refinery according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

There are few methods that exist in the prior art for simulating the operation of heat exchangers in the oil and gas refinery. The operators are unable to predict the future course of fouling trends. This is mainly because, fouling is an unpredictable phenomenon dependent upon diverse parameters such as crude mix, crude properties, flow rates, temperatures among others. Subtle changes in crude mix may alter the course of fouling significantly due to change in dominant fouling mechanism. Therefore, there is a need for a fouling forecasting system that can estimate long term fouling trends so that appropriate operation and maintenance decisions could be taken. In addition, there is a need to provide a what-if scenario tool to the operator to identify the best course of action given the prevailing situation of fouling.

Currently to mitigate the effects of fouling and ageing impact, heat exchangers are cleaned as per a fixed and periodic maintenance schedule. However, cleaning schedule of heat exchangers is highly dependent on rate of fouling and aging of deposits. Creating an optimal cleaning schedule considering the chain of interconnected heat exchangers is one of the major challenges. Therefore, there is a need of a real-time soft sensing of fouling conditions in a heat exchanger to assist the decision-making during operation.

The present disclosure herein provides a system and a method for identification and forecasting fouling of a plurality of heat exchangers in a refinery. The system comprises a digital replica of the heat exchanger network (HEN) in an oil and gas refinery. The digital replica is configured to receive real-time sensor data from a plurality of data sources and provides real-time soft sensing of key parameters such as fouling severity, fouling rate, fouling type, temperatures and heat transfer efficiency, long term forecast of key fouling indicators such as differential pressure. In addition, the system is also configured to diagnose the reasons behind a specific condition of fouling. Further, an advisory is also provided, that alerts and recommends corrective actions in terms of either heat exchanger process parameters or parameters controlled through other equipment or changes in operation or design or changes in cleaning schedule. The system provides estimate for the remaining useful life (RUL) of the heat exchangers and suggests the cleaning schedule by considering the fouling rate and severity characteristics, heat exchanger network design, heat exchanger design and maintenance history of the network as well as cost parameters.

Referring now to the drawings, and more particularly to FIG. 1 through FIG. 14, where similar reference characters denote corresponding features consistently throughout the figures, there are shown preferred embodiments and these embodiments are described in the context of the following exemplary system and/or method.

Figure 2:
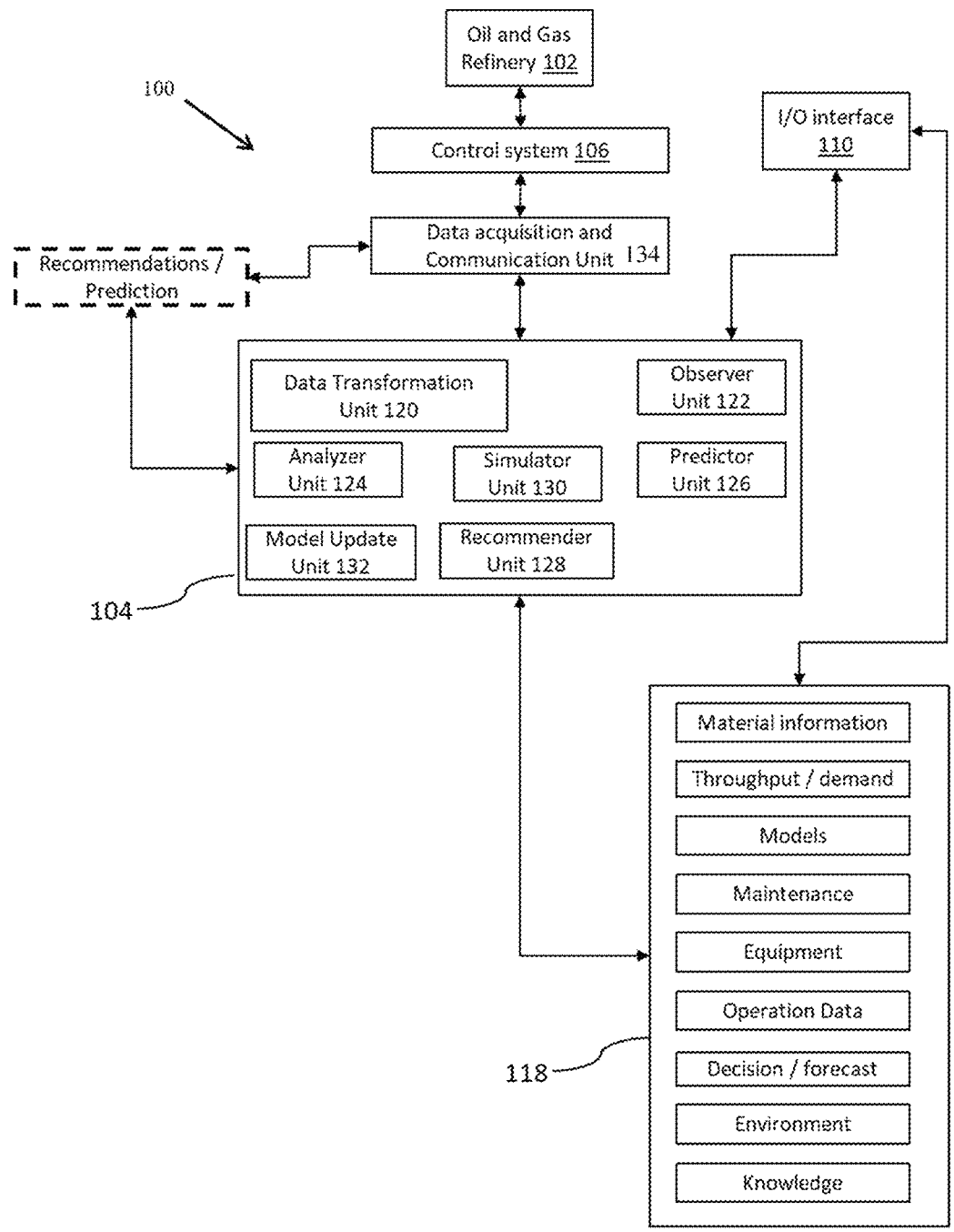
FIG. 2 is a functional block diagram of the system for identification and forecasting fouling of heat exchangers in oil and gas refinery according to some embodiments of the present disclosure.

FIG. 1 illustrates a network diagram and FIG. 2 is a block diagram of a system 100 for identification and forecasting fouling of heat exchangers in a refinery 102 such as an oil and gas refinery 102. The system 100 comprises a digital replica 104 of heat exchanger in heat recovery system of oil and gas refinery. The digital replica 104 receives real-time sensor data from a plurality of data sources and provides real-time soft sensing of key parameters such as fouling severity, fouling rate, fouling type, temperatures and heat transfer efficiency, long term forecast of key fouling indicators such as differential pressure.

The recommendations or advice from the digital replica 104 is directly passed onto a control system 106 which control the oil and gas refinery 102 for implementation, with or without any operator intervention/approval. The system 100 can be deployed on edge or on cloud. The system 100 is configured to diagnose the accuracy and applicability of current monitoring and forecasting models. If found unsatisfactory, the system 100 triggers automatic update of the models based on the data and information captured from the last update of the models. In addition, the system 100 is also configured to create new models for a different heat exchanger based on an existing model of a heat exchanger.

According to an embodiment of the disclosure, the block diagram of the system 100 for identification and forecasting fouling of a plurality of heat exchangers in the refinery 102 is shown in FIG. 2. Although the present disclosure is explained considering that the system 100 is implemented on a server, it may also be present elsewhere such as a local machine. It may be understood that the system 100 comprises one or more computing devices 108, such as a laptop computer, a desktop computer, a notebook, a workstation, a cloud-based computing environment and the like. It will be understood that the system 100 may be accessed through one or more input/output interfaces collectively referred to as I/O interface 110. Examples of the I/O interface 110 may include, but are not limited to, a user interface, a portable computer, a personal digital assistant, a handheld device, a smartphone, a tablet computer, a workstation and the like. The I/O interface 110 are communicatively coupled to the system 100 through a network 112.

In an embodiment, the network 112 may be a wireless or a wired network, or a combination thereof. In an example, the network 112 can be implemented as a computer network, as one of the different types of networks, such as virtual private network (VPN), intranet, local area network (LAN), wide area network (WAN), the internet, and such. The network 112 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 112 may include a variety of network devices, including routers, bridges, servers, computing devices, storage devices. The network devices within the network 112 may interact with the system 100 through communication links.

The system 100 may be implemented in a workstation, a mainframe computer, a server, and a network server. In an embodiment, the computing device 108 further comprises one or more hardware processors 114, one or more memory 116, hereinafter referred as a memory 116 and a data repository 118, for example, a repository 118 or a database 118. The memory 116 is in communication with the one or more hardware processors 114, wherein the one or more hardware processors 114 are configured to execute programmed instructions stored in the memory 116, to perform various functions as explained in the later part of the disclosure. The repository 118 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, the memory 116 comprises a plurality of units. The plurality of units is a set of instructions and configured to perform a plurality of functions. The plurality of units comprises a data transformation unit 120 or a data processing unit 120, an observer unit 122, an analyzer unit 124, a predictor unit 126, a recommender unit 128, a simulator unit 130, and a model update unit 132.

According to an embodiment of the disclosure, an input data is collected from a plurality of data sources 134. The plurality of data sources 134 comprises one or more of comprises a distributed control system (DCS), one or more of Supervisory Control and Data Acquisition (SCADA) System, Enterprise Resource Planning (ERP) system, a historian, a laboratory information management system (LIMS), Manufacturing Execution System (MES), Manufacturing Operations Management System (MOM), databases, a plurality of sensors, external sources, manual input and other digital systems in plant. The data can also be entered manually by the user/operator using the I/O interface 110. The data can also be collected from a plurality of sensors installed for sensing specific operating conditions. This data and the historical data accumulated in a data historian is connected to the digital twin (on edge/cloud) through a communication interface. According to an embodiment of the disclosure, the data repository 118 may comprise of information/data related to materials, refinery performance, maintenance information, design information, equipment information, predictive models, optimization models, operation data, processed data, recommendations/ decisions from the system, environmental parameters and expert knowledge among others.

According to an embodiment of the disclosure, the system 100 comprises the data transformation unit 120. The data transformation unit 120 is configured to receive a plurality of data from various sources and preprocess it in as per the requirement of other units. The transformation of data comprises identification and removal of outliers, imputation of missing data, and synchronization and integration of a plurality of variables from one or more data sources, transforming the plurality of data into a plurality of shapes, sizes and frequencies based on predefined forecast horizon. The sampling frequency of real-time and non-real-time data may be unified to, for example, once every 1 min, where the real-time data is averaged as necessary and the non-real-time data is interpolated or replicated as necessary. Additional data transformation required for specific units can also be performed.

The plurality of data comprises of feed flow rates, feed temperatures and feed pressure measurement at inlet of the heat exchanger, design data of the heat exchanger, design of the heat exchanger network. The feed temperature measurement data is used by a thermal properties model to predict thermal properties of feeds. Thermal properties of feeds are predicted separately for each heat exchanger in the heat exchanger network. The thermal properties of feed comprise of heat capacity, kinematic viscosity, specific gravity and so on. The processed plurality of data along with various other information is used for various purposes as follows:

The preprocessed plurality of data, thermal properties of feeds, heat exchanger design data are used as input for a heat transfer efficiency model to predict outlet temperatures of the feeds and a heat transfer efficiency of the heat exchanger in real time for each heat exchanger in the heat exchanger network separately.

Preprocessed plurality of data, thermal properties of feeds, the outlet temperature of the feeds are used as input for a fouling type prediction model to predict the fouling type for each heat exchanger in heat exchanger network.

Preprocessed data, thermal properties of feeds, outlet temperature of feeds and fouling type are used as input to a fouling parameter estimation model to predict in real time the fouling coefficients for each heat exchanger in heat exchanger network separately. Fouling coefficient for heat exchanger comprises of fouling deposition coefficient, fouling suppression coefficient, fouling activation energy, ageing pre-exponential parameter, ageing activation energy.

Preprocessed data, thermal properties of feeds, the outlet temperature of feeds, the thermal efficiency, the fouling type, the fouling coefficients are used as input for real time prediction of fouling rate and fouling severity using a fouling propensity index prediction model for each heat exchanger in the heat exchanger network.

A pressure drop model is used to soft sense the outlet pressure of feeds for each heat exchanger in heat exchanger network. Input of pressure drop model comprises of preprocessed data, thermal properties of feeds, outlet temperature of feeds, thermal efficiency, fouling type, fouling coefficients.

Figure 4:
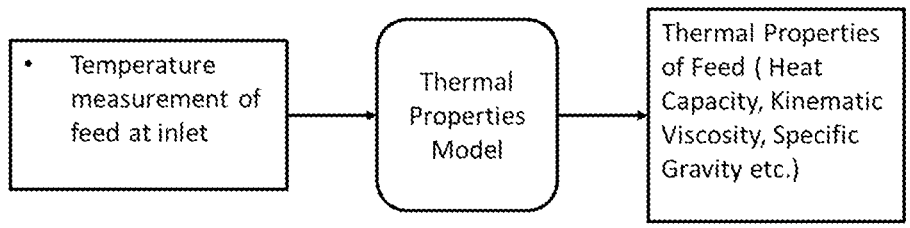
FIG. 4 is a schematic block diagram of a thermal properties model, according to some embodiments of the present disclosure.

A schematic block diagram illustrating a thermal properties model is shown in FIG. 4. The thermal properties model comprises of the data driven model. The model uses an inlet temperature measurement of feed as input to predict the thermal properties of the feeds of the heat exchanger. Thermal properties of each feed of heat exchanger in heat exchanger network. Thermal properties of feeds comprise of heat capacity, kinematic viscosity, specific gravity and so on. Thermal properties model can be distinct for each feed of the heat exchanger.

Figure 5:
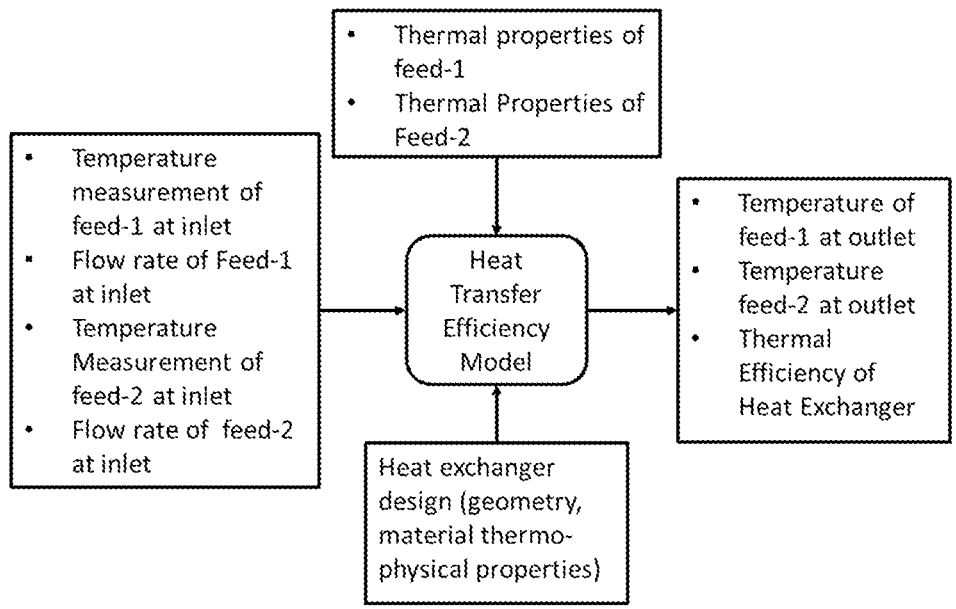
FIG. 5 is a schematic block diagram of a heat transfer efficiency model, according to some embodiments of the present disclosure.

A schematic block diagram illustrating the heat transfer efficiency model is shown FIG. 5. The heat transfer efficiency model comprises of the first principle-based models and the data driven models. In an embodiment of this disclosure, the heat transfer efficiency model may also comprise of a physics-based model that solves differential equations representing the flow, and heat transfer involved in the heat exchanger heat transfer process. The model uses the preprocessed operation data (real time sensor data for flow rates of feeds, temperature measurement of feeds), design data of heat exchangers (geometry, material thermo-physical properties), predicted thermal properties of feeds as input for prediction of outlet temperatures of feeds and heat transfer efficiency of the heat exchanger.

Figure 6:
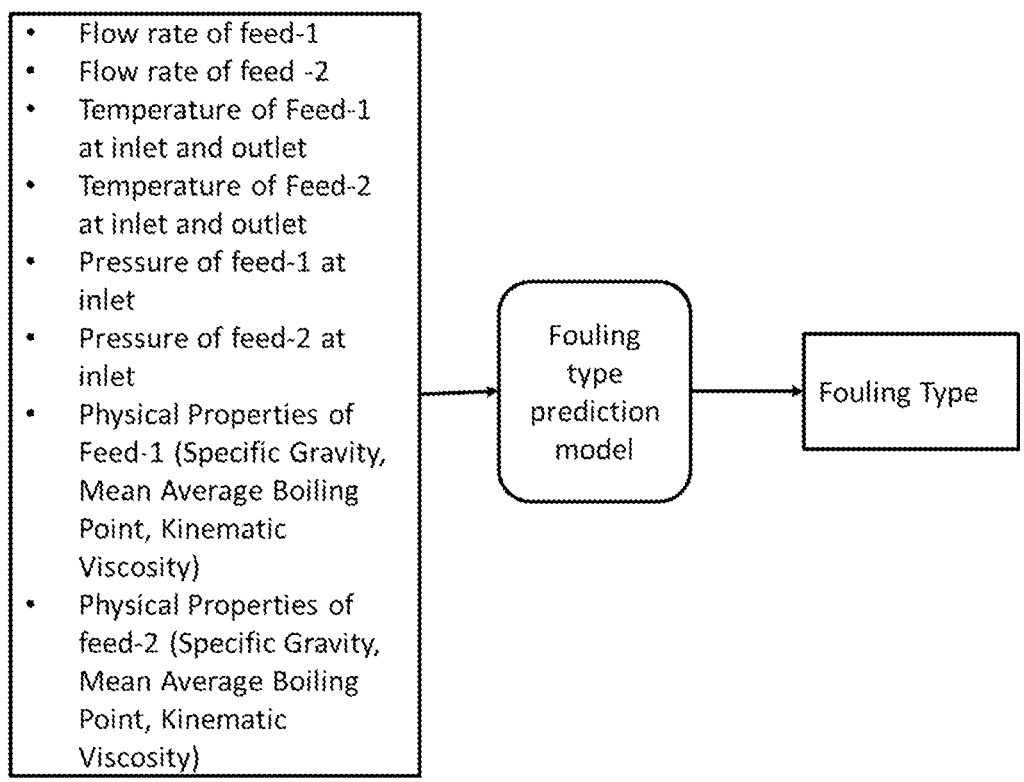
FIG. 6 is a schematic block diagram of a fouling type prediction model, according to some embodiments of the present disclosure.

A schematic block diagram illustrating the fouling type prediction model is shown FIG. 6. The fouling type prediction model comprises either or combination of data driven models, knowledge-based models, and rule-based models. The model uses the preprocessed operation data (real time sensor data for flow rates of feeds, temperature measurement of feeds, pressure measurement of feeds), design data of heat exchangers (geometry, material thermo-physical properties), predicted thermal properties of feeds, thermal efficiency of the heat exchanger as input. This model predicts, the type of fouling heat exchanger undergoes in real time for the heat exchanger. The fouling type prediction model can be distinct for distinct heat exchanger in the heat exchanger network.

Figure 7:
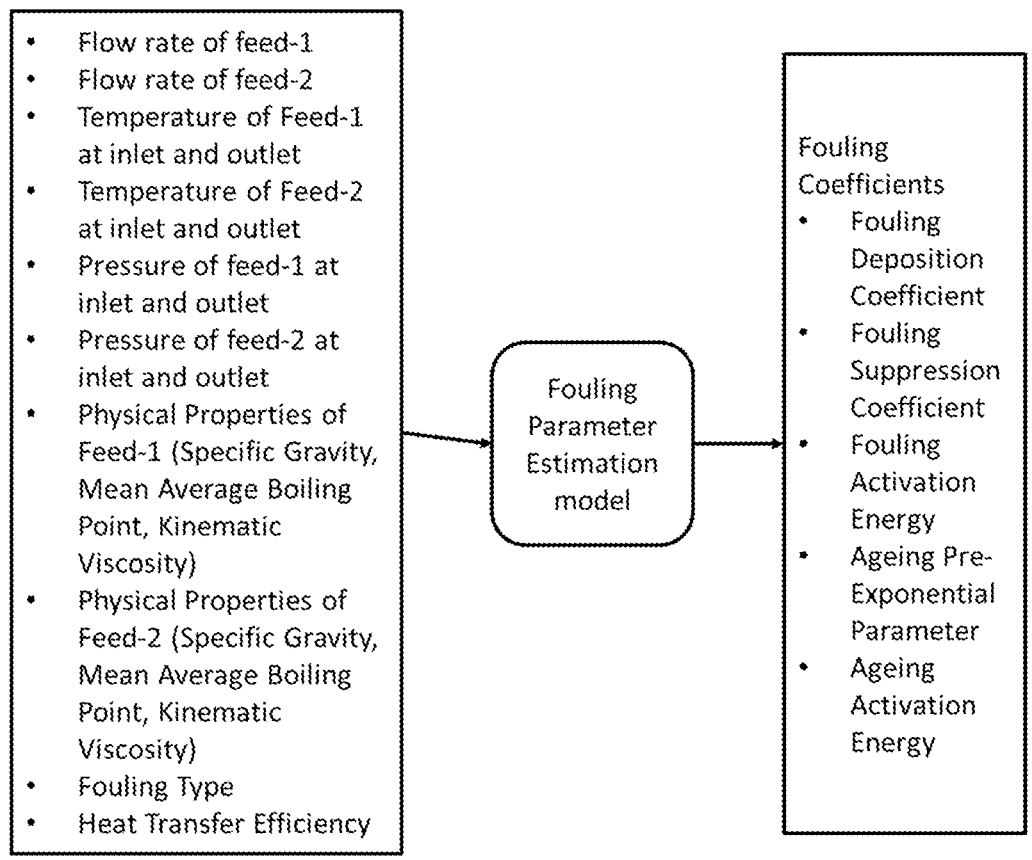
FIG. 7 is a schematic block diagram of a fouling parameter estimation model, according to some embodiments of the present disclosure.

A schematic block diagram illustrating the fouling parameter estimation model is shown FIG. 7. The fouling parameter estimation model comprises either or combination of the data driven models, the knowledge-based models, and the rule-based models. The model uses the preprocessed operation data (real time sensor data for flow rates of feeds, temperature measurement of feeds, pressure measurement of feeds), design data of heat exchangers (geometry, material thermo-physical properties), predicted thermal properties of feeds, predicted fouling type, thermal efficiency of the heat exchanger as input. This model predicts, fouling coefficients for each heat exchanger of the heat exchanger network. The fouling coefficient for the heat exchanger comprises of fouling deposition coefficient, fouling suppression coefficient, fouling activation energy, ageing pre-exponential parameter, ageing activation energy. The predicted fouling coefficients are further used as input parameters for the fouling propensity index prediction model. The fouling parameter estimation model can be distinct for distinct heat exchanger in the heat exchanger network.

Figure 8:
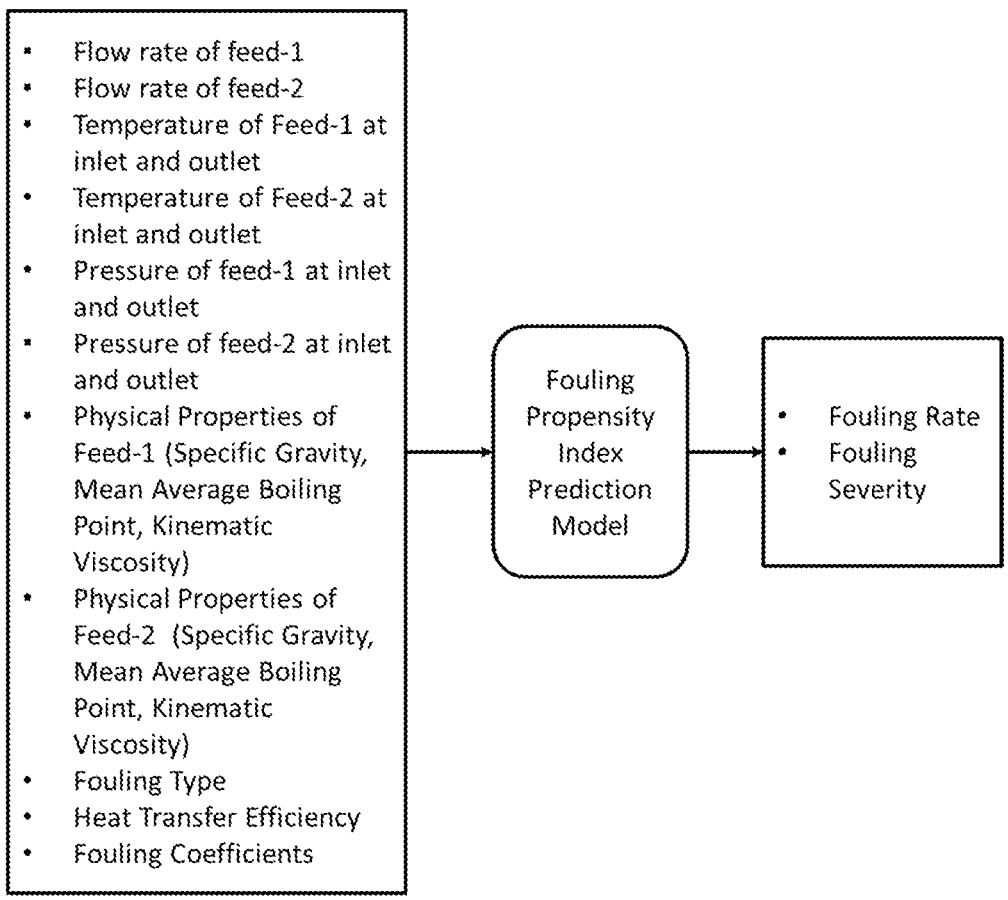
FIG. 8 is a schematic block diagram of a fouling propensity index prediction model, according to some embodiments of the present disclosure.

A schematic block diagram illustrating the fouling propensity index prediction model is shown FIG. 8. The fouling propensity index prediction model comprises either or combination of first principle-based models, data driven models, knowledge-based models, and rule-based models. The model uses the preprocessed operation data (real time sensor data for flow rates of feeds, temperature measurement of feeds, pressure measurement of feeds), design data of heat exchangers (geometry, material thermo-physical properties), predicted thermal properties of feeds, predicted fouling type, predicted fouling coefficients and thermal efficiency of the heat exchanger as input. This model predicts, fouling rate and fouling severity for the heat exchanger. The fouling propensity index prediction model can be distinct for distinct heat exchanger in the heat exchanger network.

Figure 9:
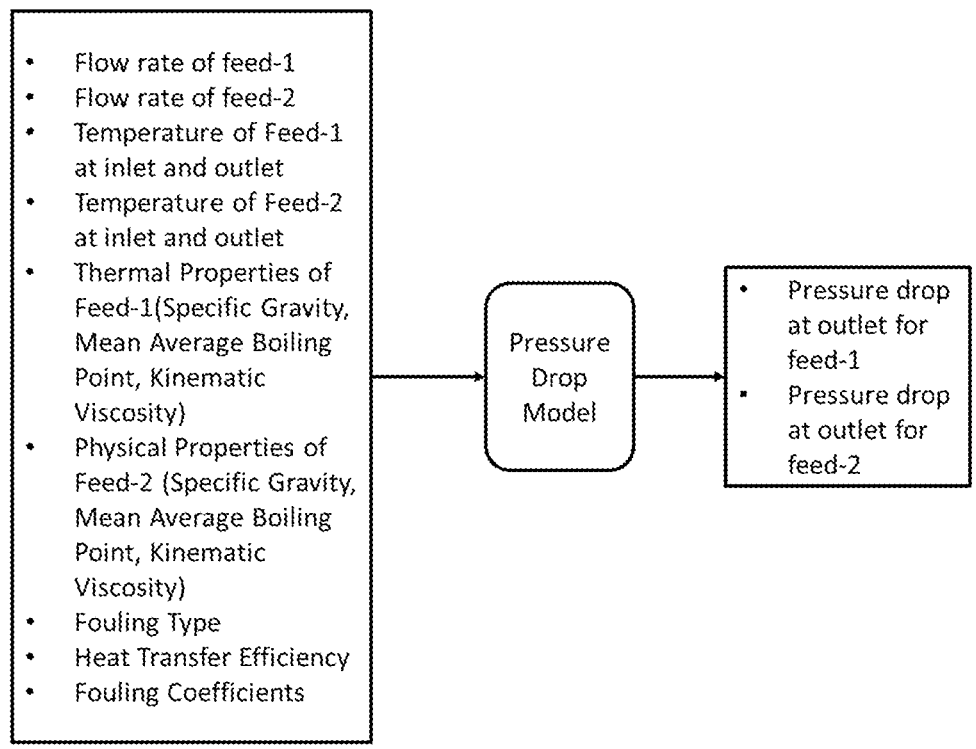
FIG. 9 is a schematic block diagram of a pressure drop model, according to some embodiments of the present disclosure.

A schematic block diagram illustrating the pressure drop model is shown FIG. 9. The pressure drop model comprises either or combination of first principle-based models, data driven models, knowledge-based models, and rule-based models. The model uses the preprocessed operation data (real time sensor data for flow rates of feeds, temperature measurement of feeds), design data of heat exchangers (geometry, material thermo-physical properties), predicted thermal properties of feeds, predicted fouling type, predicted fouling coefficients and thermal efficiency of the heat exchanger as input. This model predicts, pressure drop for feeds of the heat exchanger. The pressure drop model can be distinct for distinct heat exchanger in the heat exchanger network.

Figure 3:
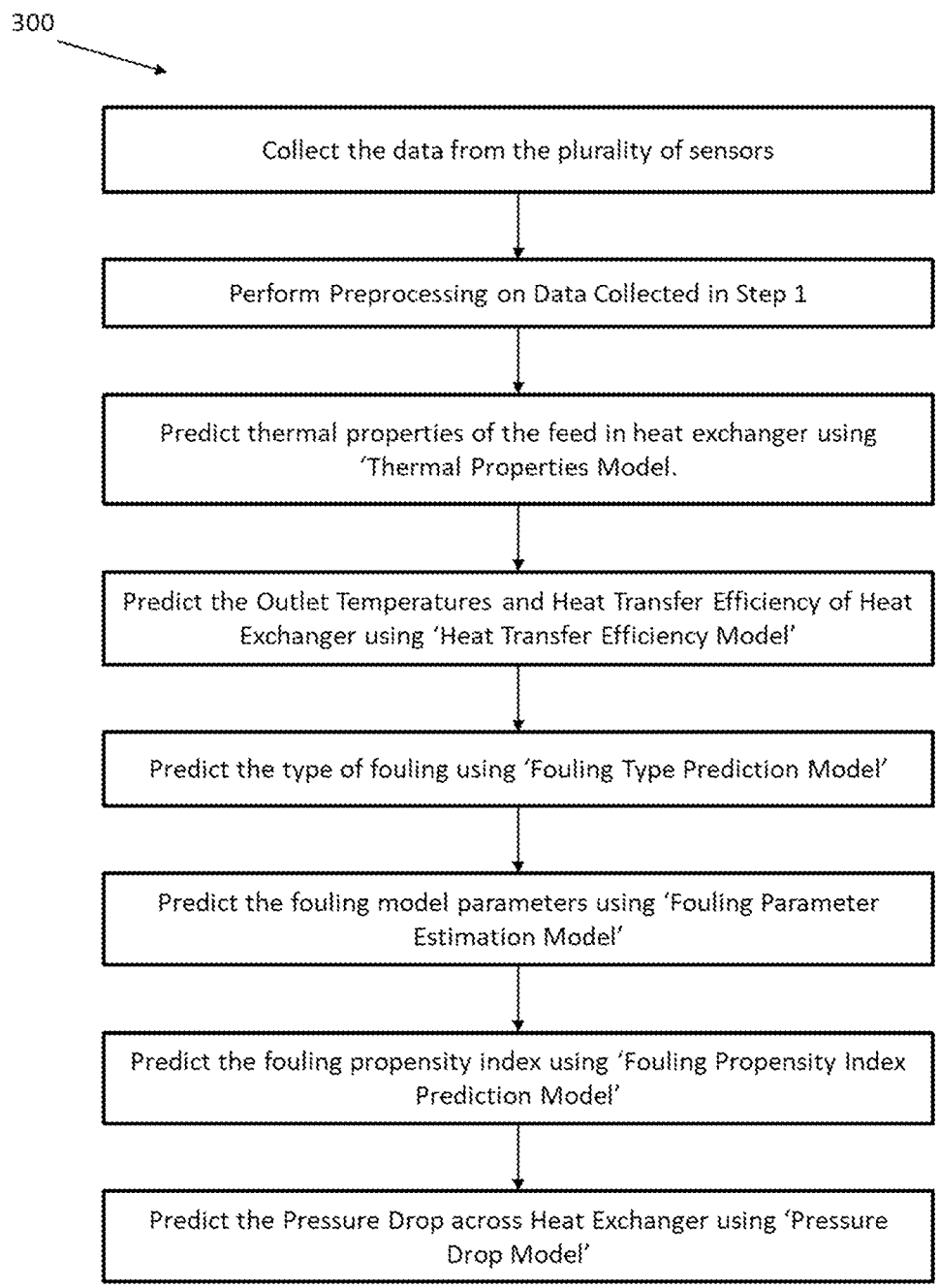
FIG. 3 is a flowchart illustrating steps involved in the operation of an observer model according to some embodiments of the present disclosure.

According to an embodiment of the disclosure the system 100 comprises the observer unit 122. The observer unit 122 is configured to soft sense, a plurality of operating parameters, a plurality of fouling parameters and a fouling propensity index for each heat exchanger amongst the plurality of heat exchangers using models present in the observer unit 122. A flowchart 300 illustrating the steps involved in the observer unit 122 is shown in FIG. 3. In addition, the observer unit 122 is also configured to interface with internal/external tools/models available in the system 100 for improved predictions.

According to an embodiment of the disclosure the system 100 comprises the analyzer unit 124. The analyzer unit 124 configured to detecting in real-time, a root cause of fouling by comparing the soft sensed plurality of operating parameters, the plurality of fouling parameters and the fouling propensity index using a set of predefined knowledge-based rules present in the analyzer unit 124. The analyzer unit 124 diagnoses operating regime changes, working fluid property variations and chemical/mechanical changes of fouling.

According to an embodiment of the disclosure the system 100 also comprises the predictor unit 126. The predictor unit 126 is configured to forecast, the fouling propensity index for a predefined forecast horizon for each heat exchanger amongst the plurality of heat exchangers using a plurality of forecast models present in the predictor unit 126. The plurality of forecast models is pre-built using the historically detected root cause of fouling and the soft sensed plurality of operating parameters and the plurality of fouling parameters. The fouling propensity index is indicative of the long term forecast for key fouling indicators of heat exchanger such as but not limited to fouling severity and fouling rate. In another example, the predictor unit 126 may also forecast pressure drop in heat exchanger and thermal performance of heat exchanger.

According to an embodiment of the disclosure, the predictor unit 126 is also configured to find a remaining useful life (RUL) of each heat exchanger amongst the plurality of heat exchangers using the forecasted fouling propensity index for the predefined forecast horizon remaining useful operational life of the heat exchanger.

Figure 10:
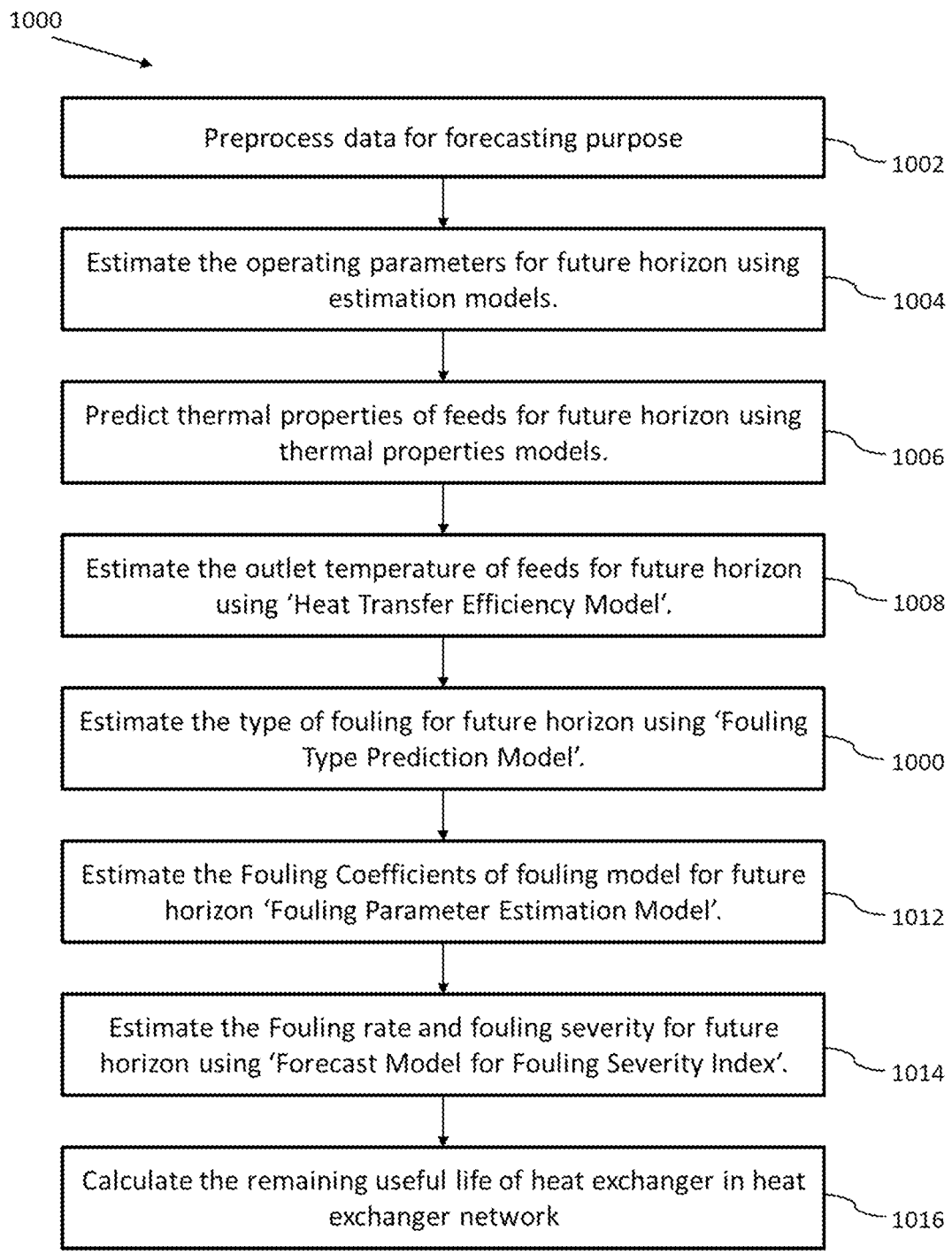
FIG. 10 is a flowchart illustrating steps involved in forecasting a fouling rate and a fouling severity over a predefined forecasting horizon according to some embodiments of the present disclosure.

The fouling propensity index can also be indicated by the forecasting fouling rate and fouling severity. FIG. 10 is a flowchart 1000 illustrating steps involved in forecasting the fouling rate and the fouling severity over a predefined forecasting horizon $t_f$ and calculation of RUL of the heat exchanger. At step 1002, the preprocessed data from the data transformation unit 120 and the soft sensed data from the observer unit 122 are transformed appropriately. This transformation may comprise merging data, down sampling the data, appropriate scaling, removing outliers and cleaning the data. At step 1004, the operating parameters for the predefined forecast horizon $t_f$ are estimated. The plurality of operating parameters comprises of flow rates of feeds, inlet temperature of feeds for each heat exchanger in heat exchanger network. At step 1006, the thermal properties of the feeds are estimated using estimated plurality of operating parameters using the thermal properties model in the observer unit 122 for the predefined forecast horizon for each heat exchanger in heat exchanger network. At step 1008, the temperatures of feeds are estimated at an outlet of each heat exchanger using the estimated thermal properties, the estimated plurality of operating parameters and design data of heat exchanger using the heat transfer efficiency model in the observer unit 122 in the heat exchanger network. At step 1010 the fouling type is predicted using the estimated plurality of operating parameters, the estimated thermal properties, the estimated outlet temperatures using the fouling type prediction model of the observer unit 122 for each heat exchanger in heat exchanger network. At step 1012, fouling coefficients are predicted for future horizon using the estimated plurality of operating parameters, the estimated thermal properties, the estimated outlet temperatures, the estimated fouling type, and the estimated heat transfer efficiency using the fouling parameter estimation model for each heat exchanger in heat exchanger network. At step 1014 a fouling rate and the fouling severity is forecasted using the forecast model for the fouling severity index for each heat exchanger in heat exchanger network. Each heat exchanger in heat exchanger network may have distinct forecast model for fouling severity index. Input of the forecast model for fouling severity index comprise of the estimated data for the predefined forecast horizon and historical data of operation parameters, thermal properties of feeds, outlet temperatures of feeds of a heat exchanger in network and estimated data for forecast horizon and historical data of fouling type, fouling coefficients of all heat exchangers in network. And finally, at step 1016, the remaining useful life is calculated using the forecasted fouling rate and the fouling severity for the heat exchanger in heat exchanger network.

Figure 11:
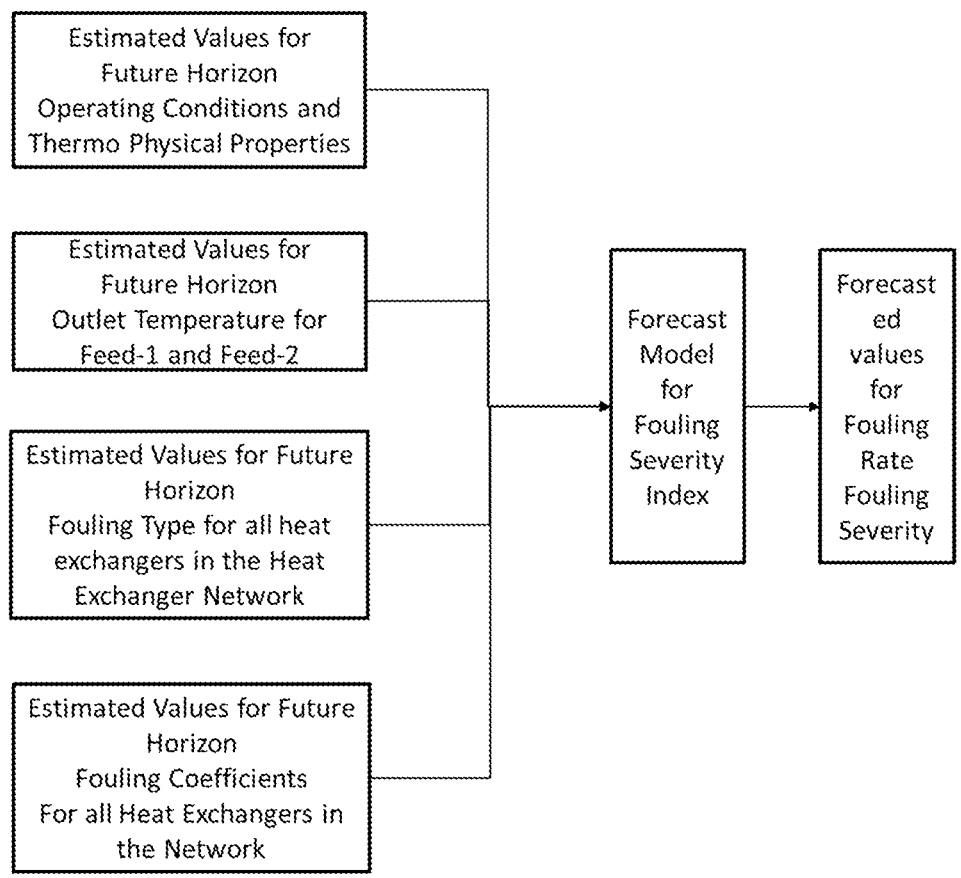
FIG. 11 is a block diagram of the forecast model for calculating the fouling severity index according to some embodiments of the present disclosure.

According to an embodiment of the disclosure, FIG. 11 illustrates a block diagram of the forecast Model for calculating fouling severity index. Historical data and estimated values for future horizon for operation condition, thermo physical properties of feeds, outlet temperatures of feeds of a heat exchanger and historical data along with estimated values for future horizon for fouling type and fouling coefficients for all heat exchangers in network are used as input for the forecast model for the fouling severity index. Output of this model comprise of fouling severity and the fouling rate in the heat exchanger. Forecast model for the fouling severity index can be distinct for distinct heat exchangers in the network. Forecast of fouling rate and fouling severity is performed for each heat exchanger in the heat exchanger network.

According to an embodiment of the disclosure the system 100 comprises the recommender unit 128. The recommender 128 unit is configured to recommend, one or more of activity based on a set of forecasted parameters, operation constraint parameters and the RUL of each of the heat exchangers. The one or more activity comprises a cleaning and maintenance schedule of one or more of heat exchanger, or a set of operational changes in the one or more heat exchangers to increase the RUL. The recommendations are based on current and expected fouling conditions for optimizing efficiency, minimizing costs etc. Further, scheduling and maintenance advises are based on the forecast of fouling trends. In addition, the system 100 can also advise deployment of additional sensors at appropriate locations for increasing accuracy of fouling identification.

Figure 12:
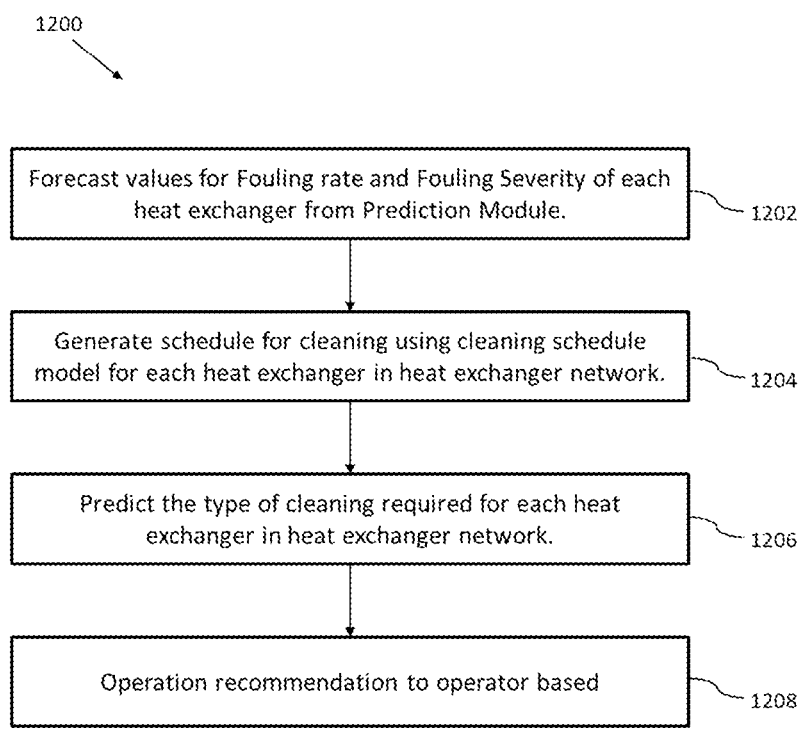
FIG. 12 is a flowchart illustrating the steps involved in generating of cleaning schedule and operation recommendation according to some embodiments of the present disclosure.

FIG. 12 is a flowchart 1200 illustrating the steps for generation of cleaning schedule and operation recommendation in the recommender unit 128. At step 1202, forecasted data for fouling severity and the fouling rate of each heat exchanger in the heat exchanger network is obtained from the prediction unit 126. At step 1204, an optimal cleaning schedule is generated using a cleaning schedule generation model using forecasted fouling severity and rate, predicted RUL, design data, and maintenance history of each heat exchanger in the heat exchanger network and cost parameters data. Cost parameters data comprises of cost parameter for cleaning, maintenance planning, unavailability of the heat exchanger, and production loss due to unavailability of the heat exchanger. At step 1206, type of cleaning to be performed for each heat exchanger is recommended to the operator based on the cleaning schedule generation model and the fouling severity data. Operation recommendation can be generated using knowledge-based model. And finally, at step 1208, operation recommendations are provided to the user based on the optimal cleaning schedule generated using a knowledge-based model. For example, based on optimal cleaning schedule system may suggest changes in feed flow rates in heat exchanger network to operator.

Figure 13:
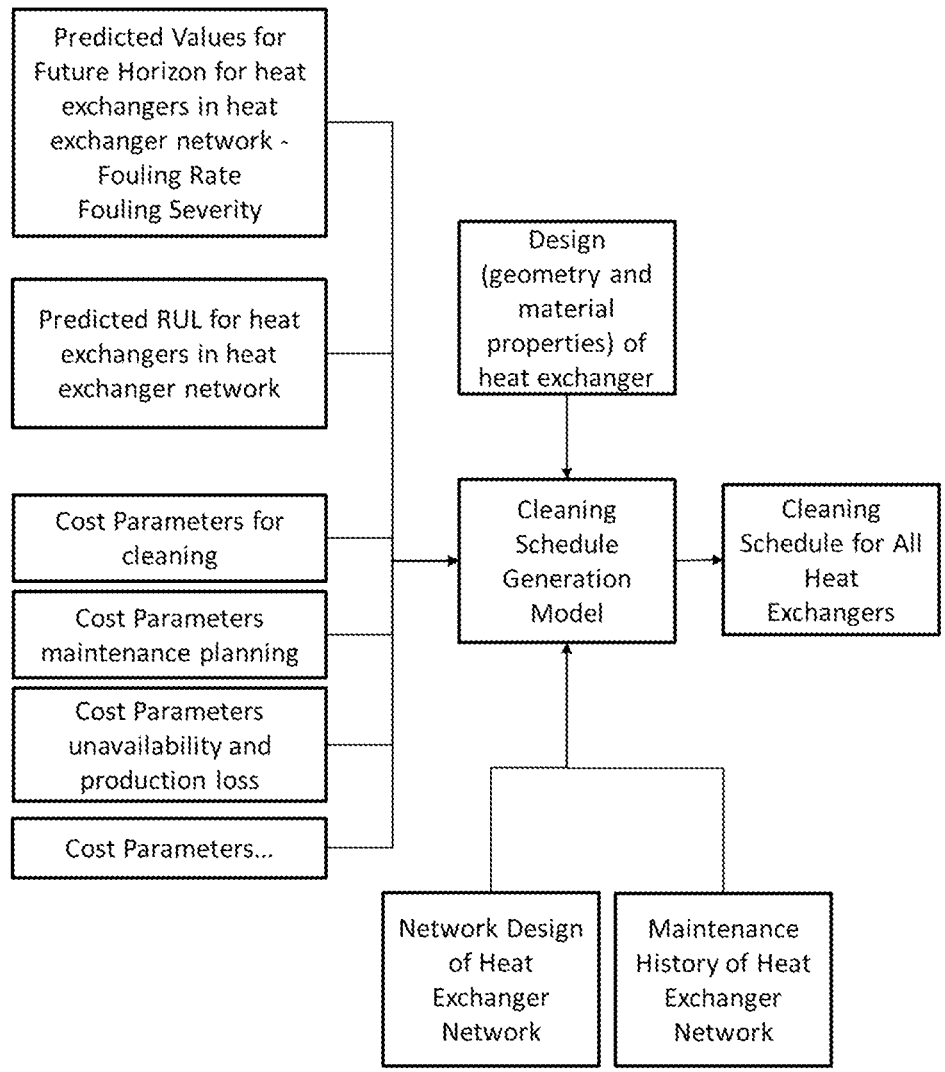
FIG. 13 is a block diagram of the recommender unit according to some embodiments of the present disclosure.

FIG. 13 shows a block diagram of the recommender unit 128 using the cleaning schedule generation model. The cleaning schedule generation model comprises model based on either or combination of deep learning algorithm, reinforcement learning algorithm and optimization algorithm. Input for the cleaning schedule generation model comprise of forecasted fouling severity and rate for each heat exchanger in the heat exchanger network from the predictor unit 126, predicted RUL for each heat exchanger in the heat exchanger network form the predictor unit 126. design of heat exchangers in the heat exchanger network, network design of the heat exchanger network, maintenance history of heat exchanger network and cost parameters (cleaning, maintenance planning, unavailability, and production loss).

Figure 14:
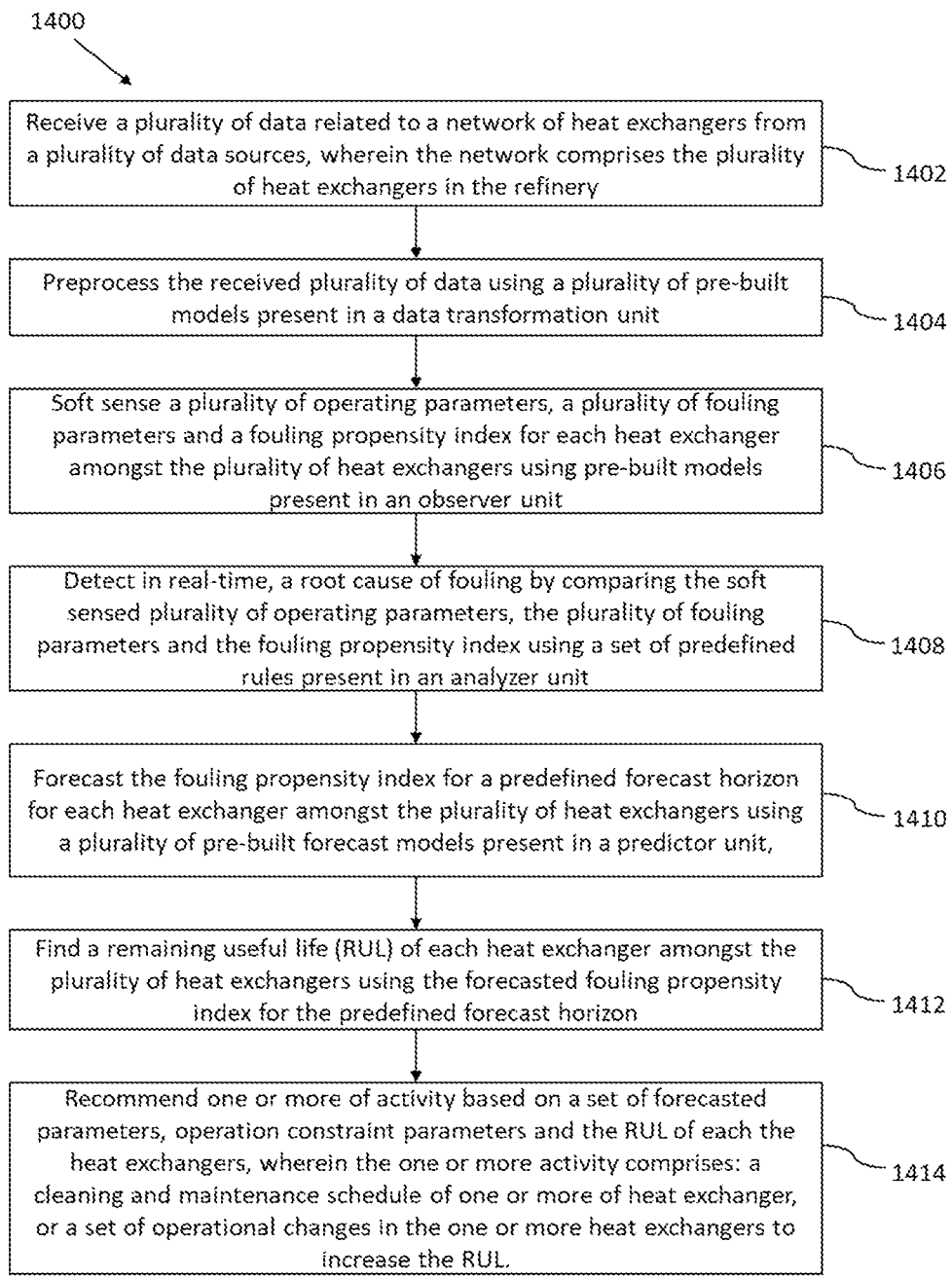
FIG. 14 is a flow diagram illustrating method for identification and forecasting fouling of heat exchangers in oil and gas refinery in accordance with some embodiments of the present disclosure.

In operation, referring to FIG. 14, flow diagram of a method 1400 for identification and forecasting fouling of a plurality of heat exchangers in the refinery 102 is described in accordance with an example embodiment. The method 1400 depicted in the flow chart may be executed by a system, for example, the system, 100 of FIG. 1. In an example embodiment, the system 100 may be embodied in the computing device as explained above.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 1400 are described with help of system 100. However, the operations of the method 1400 can be described and/or practiced by using any other system.

Initially at step 1402, a plurality of data related to the heat exchangers network is received from a plurality of data sources 134, wherein the network comprises the plurality of heat exchangers in the refinery 102. At step 1404, the received plurality of data is preprocessed and transformed. At step 1406, the plurality of operating parameters, the plurality of fouling parameters and the fouling propensity index is soft sensed for each heat exchanger amongst the plurality of heat exchangers using models present in the observer unit 122. Further at step 1408, a root cause of fouling is detected in real-time, by comparing the soft sensed plurality of operating parameters, the plurality of fouling parameters and the fouling propensity index using a set of predefined knowledge-based rules present in the analyzer unit 124.

At step 1410 of the method 1400, the fouling propensity index is forecasted for the predefined forecast horizon for each heat exchanger amongst the plurality of heat exchangers using a plurality of forecast models present in the predictor unit 126, wherein the plurality of forecast models is pre-built using the historically detected root cause of fouling and the soft sensed plurality of operating parameters and the plurality of fouling parameters. At step 1412, a remaining useful life (RUL) of each heat exchanger amongst the plurality of heat exchangers is obtained using the forecasted fouling propensity index for the predefined forecast horizon. And finally, at step 1414, one or more of activities is recommended based on a set of parameters and the RUL of each of the heat exchangers, wherein the one or more activities comprises: a cleaning and maintenance schedule of one or more of heat exchanger, or a set of operational changes in the one or more heat exchangers to increase the RUL.

According to an embodiment of the disclosure the system 100 comprises the simulator unit 130. The simulator unit 130 is configured to simulate and understand the impact of 'what if' and 'if-what' scenarios for heat exchanger for e.g. refinery operator can forecast the fouling characteristics for different types of crude oil blends.

According to an embodiment of the disclosure the system 100 comprises the model update unit 132. The model update unit 132 enables automatic update of models if performance of the models is below a set threshold. The plurality of units used in the system comprises of specific models to carry out the intended tasks. This unit assist in calibrating existing models for prediction of fouling and other parameters with respect to the current performance of the heat exchangers. This may also comprise of tools for adapting a model built for a specific heat exchanger to another heat exchanger in the train or in other refinery.

It should be appreciated that the plurality of units can work in online or offline mode as per the requirement. Some of the units may operate online in the background or some may work online in real-time. This system 100 can be applied to heat exchangers used in oil refinery as well as any other heat exchangers experiencing similar fouling, for example, heat exchangers in pre-heat train of refinery, transfer line exchangers in refinery. The system 100 may also include optimization solvers and reinforcement learning techniques for optimal control. The models could in turn interface with external models/tools, may receive inputs/outputs and may iterate over them. The plurality of units is supported by an interactive user interface that can be used to provide external inputs, receive outputs/recommendations, visualizations of analytics.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of costs and effort involved in the maintenance of heat exchangers in the refinery. The embodiment thus provides a method and system for identification and forecasting fouling of a plurality of heat exchangers in a refinery.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for identification and forecasting fouling of a plurality of heat exchangers in a refinery, the method comprising:

receiving, via one or more hardware processors, a plurality of data related to a heat exchanger network from a plurality of data sources, wherein the heat exchanger network comprises a plurality of heat exchangers in the refinery, wherein receiving the plurality of data comprises receiving a plurality of real-time sensor data from the plurality of data sources;

preprocessing, via the one or more hardware processors, the received plurality of data using a plurality of pre-built models present in a data transformation unit;

soft sensing, via the one or more hardware processors, in real-time a plurality of operating parameters, a plurality of fouling parameters and a fouling propensity index for each heat exchanger amongst the plurality of heat exchangers using pre-built models present in an observer unit, wherein the plurality of operating parameters and the plurality of fouling parameters and the fouling propensity index comprises outlet temperature of each feed of the heat exchangers, an outlet pressure of each feed of the heat exchangers, heat transfer efficiency of the heat exchangers, a fouling type, fouling coefficient, fouling rate and fouling severity of the heat exchangers;

detecting in real-time, via the one or more hardware processors, a root cause of fouling by comparing the soft sensed plurality of operating parameters, the plurality of fouling parameters and the fouling propensity index using a set of predefined rules present in an analyzer unit;

forecasting, via the one or more hardware processors, the fouling propensity index for a predefined forecast horizon for each heat exchanger amongst the plurality of heat exchangers using a plurality of pre-built forecast models present in a predictor unit, wherein the plurality of pre-built forecast models are build using historically detected root cause of fouling and the soft sensed plurality of operating parameters and the plurality of fouling parameters;

finding, via the one or more hardware processors, a remaining useful life (RUL) of each heat exchanger amongst the plurality of heat exchangers using the forecasted fouling propensity index for the predefined forecast horizon;

performing one or more of activities via control system in the refinery in response to one or more recommendations generated based on at least one of a set of forecasted parameters, the forecasted fouling propensity index, operation constraint parameters, the RUL of each of the heat exchangers, cost involved in cleaning and maintenance of one or more of heat exchangers, maintenance history of the heat exchanger network, and wherein the one or more activities comprises at least one of:

cleaning and maintaining one or more of heat exchangers, and performing one or more operational changes in the one or more heat exchangers to increase the RUL.

2. The method of claim 1 further comprises enabling automatic update of models if performance of the models is below a set threshold.

3. The method of claim 1, wherein the plurality of operating parameters comprises feed temperature, feed pressure, feed flow rate, thermo-physical properties of feeds for the plurality of heat exchangers in the heat exchanger network.

4. The method of claim 1, wherein the plurality of data comprises:

real time operating parameters for the plurality of heat exchangers in the heat exchanger network where in the real time operating parameters comprises temperature measurement of feeds, pressure measurements of feeds, flow rate measurement of feeds, thermo-physical properties of the feeds, design data for the plurality of heat exchanger in the heat exchanger network, wherein design data comprises geometrical measurements of the plurality of heat exchangers, physical properties of the plurality of heat exchangers, thermal properties of the plurality of heat exchangers, design specification data of the heat exchanger network, and maintenance and cleaning history of the plurality of heat exchangers in the heat exchanger network.

5. The method of claim 1, where in the plurality of data sources comprises a distributed control system (DCS), one or more of Supervisory Control and Data Acquisition (SCADA) System, Enterprise Resource Planning (ERP) system, a historian, a laboratory information management system (LIMS), Manufacturing Execution System (MES), Manufacturing Operations Management System (MOM), databases, a plurality of sensors, external sources, manual input and other digital systems in plant.

6. The method of claim 1, wherein preprocessing of data comprises identification and removal of outliers, imputation of missing data, synchronization and integration of a plurality of variables from the plurality of data sources, transforming the plurality of data into a plurality of shapes, sizes and frequencies based on predefined forecast horizon.

7. The method of claim 1, wherein an optimal cleaning schedule is generated using a cleaning schedule generation model, wherein the cleaning schedule generation model comprises model based on either or combination of deep learning algorithm, reinforcement learning algorithm and optimization algorithm.

8. The method of claim 1, wherein the set of forecasted parameters comprises forecast of fouling coefficients, fouling severity, fouling rate, and fouling type.

9. The method of claim 1, wherein the operation constraint parameters comprises cost parameters data, heat exchanger design specification, heat exchanger network design specification.

10. The method of claim 1, wherein the root cause of fouling comprises change in feed, change in operating regime, and change in environmental conditions.

11. The method of claim 1, wherein the models in data transformation unit, the observer unit and the predictor unit comprise of data-driven models, first principles-based models, knowledge-based models and combination thereof.

12. A system for identification and forecasting fouling of a plurality of heat exchangers in a refinery, the system comprises:
   an input/output interface;
   one or more hardware processors;
   a memory in communication with the one or more hardware processors, wherein the one or more first hardware processors are configured to execute programmed instructions stored in the one or more first memories, to:
      receive a plurality of data related to a heat exchanger network from a plurality of data sources, wherein the network comprises a plurality of heat exchangers in the refinery, wherein receiving the plurality of data comprises receiving a plurality of real-time sensor data from the plurality of data sources;
      preprocess the received plurality of data using a plurality of pre-built models present in a data transformation unit;
      soft sense a plurality of operating parameters, in real-time a plurality of fouling parameters and a fouling propensity index for each heat exchanger amongst the plurality of heat exchangers using pre-built models present in an observer unit, wherein the plurality of operating parameters and the plurality of fouling parameters and the fouling propensity index comprises outlet temperature of each feed of the heat exchangers, an outlet pressure of each feed of the heat exchangers, heat transfer efficiency of the heat exchangers, a fouling type, fouling coefficient, fouling rate and fouling severity of the heat exchangers;
      detect in real-time a root cause of fouling by comparing the soft sensed plurality of operating parameters, the plurality of fouling parameters and the fouling propensity index using a set of predefined rules present in an analyzer unit;
      forecast the fouling propensity index for a predefined forecast horizon for each heat exchanger amongst the plurality of heat exchangers using a plurality of pre-built forecast models present in a predictor unit, wherein the plurality of pre-built forecast models are build using historically detected root cause of fouling and the soft sensed plurality of operating parameters and the plurality of fouling parameters;
      find a remaining useful life (RUL) of each heat exchanger amongst the plurality of heat exchangers using the forecasted fouling propensity index for the predefined forecast horizon; and
   perform, one or more of activities via control system in the refinery in response to one or more recommendations generated based on at least one of a set of forecasted parameters the forecasted fouling propensity index, operation constraint parameters, the RUL of each of the heat exchangers, cost involved in cleaning and maintenance of one or more of heat exchangers, maintenance history of the heat exchanger network, and wherein the one or more activities comprises at least one of:
      cleaning and maintaining one or more of heat exchangers, and
      perform one or more operational changes in the one or more heat exchangers to increase the RUL.

13. The system of claim 12 further comprises a model update unit via the one or more processor configured to enable automatic update of models if performance of the models is below a set threshold.

14. The system of claim 12, wherein plurality of data sources comprises a distributed control system (DCS), one or more of Supervisory Control and Data Acquisition (SCADA) System, Enterprise Resource Planning (ERP) system, a historian, a laboratory information management system (LIMS), Manufacturing Execution System (MES), Manufacturing Operations Management System (MOM), databases, a plurality of sensors, external sources, manual input and other digital systems in plant.

15. The system of claim 12, wherein the set of forecasted parameters comprises forecast of fouling coefficients, fouling severity, fouling rate, and fouling type.

16. The system of claim 12, wherein the models in data transformation unit, the observer unit and the predictor unit comprise of data-driven models, first principles-based models, knowledge-based models and combination thereof.

17. One or more non-transitory machine readable information storage mediums comprising one or more instructions which when executed by one or more hardware processors cause managing a plurality of events, the instructions cause:
   receiving a plurality of data related to a heat exchanger network from a plurality of data sources, wherein the heat exchanger network comprises a plurality of heat exchangers in the refinery, wherein receiving the plurality of data comprises receiving a plurality of real-time sensor data from the plurality of data sources;
   preprocessing the received plurality of data using a plurality of pre-built models present in a data transformation unit;
   soft sensing a plurality of operating parameters, in real-time a plurality of fouling parameters and a fouling propensity index for each heat exchanger amongst the plurality of heat exchangers using pre-built models present in an observer unit, wherein the plurality of operating parameters and the plurality of fouling parameters and the fouling propensity index comprises outlet temperature of each feed of the heat exchangers, an outlet pressure of each feed of the heat exchangers, heat transfer efficiency of the heat exchangers, a fouling type, fouling coefficient, fouling rate and fouling severity of the heat exchangers;

detecting in real-time, a root cause of fouling by comparing the soft sensed plurality of operating parameters, the plurality of fouling parameters and the fouling propensity index using a set of predefined rules present in an analyzer unit;

forecasting the fouling propensity index for a predefined forecast horizon for each heat exchanger amongst the plurality of heat exchangers using a plurality of pre-built forecast models present in a predictor unit;

finding a remaining useful life (RUL) of each heat exchanger amongst the plurality of heat exchangers using the forecasted fouling propensity index for the predefined forecast horizon; and performing one or more of activities via control system in the refinery in response to one or more recommendations generated based on at least one of a set of forecasted parameters the forecasted fouling propensity index, operation constraint parameters, the RUL of each of the heat exchangers, cost involved in cleaning and maintenance of one or more of heat exchangers, maintenance history of the heat exchanger network, and wherein the one or more activities comprises at least one of:

cleaning and maintaining one or more of heat exchangers, and performing one or more operational changes in the one or more heat exchangers to increase the RUL.

\* \* \* \* \*